(12) United States Patent
Gupta

(10) Patent No.: US 9,025,745 B2
(45) Date of Patent: *May 5, 2015

(54) DO NOT CALL LIST ENFORCEMENT SYSTEM AND METHOD

(71) Applicant: CenturyLink Intellectual Property LLC, Denver, CO (US)

(72) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/727,930

(22) Filed: Dec. 27, 2012

(65) Prior Publication Data

US 2013/0121482 A1  May 16, 2013

Related U.S. Application Data

(63) Continuation of application No. 12/415,422, filed on Mar. 31, 2009, now Pat. No. 8,363,803.

(51) Int. Cl.
*H04M 1/56* (2006.01)
*H04M 15/06* (2006.01)
*H04M 3/436* (2006.01)

(52) U.S. Cl.
CPC ............ *H04M 3/4365* (2013.01); *H04M 3/436* (2013.01)

(58) Field of Classification Search
USPC .............. 379/210.02, 213.01, 201.01, 142.02
See application file for complete search history.

(56) References Cited

U.S. PATENT DOCUMENTS

| | | | |
|---|---|---|---|
| 6,332,021 B2 * | 12/2001 | Latter et al. | ............... 379/142.01 |
| 7,020,259 B2 | 3/2006 | Hussain et al. | |
| 7,295,660 B1 | 11/2007 | Higginbotham et al. | |
| 7,298,833 B2 | 11/2007 | Klein et al. | |
| 8,363,803 B2 | 1/2013 | Gupta | |
| 2007/0127652 A1 | 6/2007 | Divine et al. | |
| 2007/0143422 A1 | 6/2007 | Cai | |

(Continued)

OTHER PUBLICATIONS

Nextphase, Inc. dba Family Safe Media (1998-2009). Preserving Family Values in a Media Driven Society. Telemarketer Call Screener vs. Screen Machine vs. TeleZapper Comparison Chart. Web Site http://familysafemedia.com/telemarketer_block_comparison_.html. Accessed on Feb. 18, 2009, 4 pages.

(Continued)

*Primary Examiner* — Quynh Nguyen
(74) *Attorney, Agent, or Firm* — Swanson & Bratschun, L.L.C.

(57) ABSTRACT

A system and method for reducing unwanted telemarketing calls may include storing a contact list for users of a telephone assigned to an associated telephone number. An incoming telephone call from a caller may be intercepted and a determination may be made as to whether the caller is in the contact list. In response to determining that the caller is in the contact list, the incoming call may be connected to the telephone assigned to the called telephone number. Otherwise, in response to determining that the caller is not in the contact list, the caller may be prompted with an audible message, and, in response to the caller responding to the audible message by entering a first response, the incoming call may be blocked from connecting to the called telephone. Otherwise, in response to a second response, the incoming call may be connected.

20 Claims, 4 Drawing Sheets

(56) References Cited

U.S. PATENT DOCUMENTS

2008/0279359 A1* 11/2008 Tiliks et al. .............. 379/210.02
2010/0246794 A1 9/2010 Gupta

OTHER PUBLICATIONS

Royal Appliance Mfg. Co. (2002-2004). TeleZapper. Web Site www.telezapper.com. Accessed on Feb. 18, 2009, 1 page.

Stealth Software. Talking Caller ID. Web Site www.talkingcallerid.com. Accessed on Feb. 18, 2009, 4 pages.

U.S. Appl. No. 12/415,422 Final Rejection dated Apr. 9, 2012; 10 pages.
U.S. Appl. No. 12/415,422; Issue Notification dated Jan. 9, 2013; 1 page.
U.S. Appl. No. 12/415,422; Non-Final Rejection dated Nov. 3, 2011; 16 pages.
U.S. Appl. No. 12/415,422; Notice of Allowance dated Oct. 1, 2012; 15 pages.
U.S. Appl. No. 12/415,422; Notice of Appeal dated Jul. 9, 2012; 10 pages.
U.S. Appl. No. 12/415,422; Pre-Appeal Decision dated Sep. 18, 2012; 2 pages.

* cited by examiner

DO NOT CALL LIST ENFORCEMENT SYSTEM AND METHOD

CROSS REFERENCE TO RELATED APPLICATION

This application is a continuation of U.S. patent application Ser. No. 12/415,422, filed Mar. 31, 2009 by Shekhar Gupta and entitled, "Do Not Call List Enforcement System and Method", which is hereby incorporated by reference in its entirety.

BACKGROUND

A National "Do Not Call" registry has been established in the United States by the Federal Communications Commission (FCC) to provide consumers with a choice to not receive calls from telemarketers. To register a telephone number on the Do Not Call Registry, consumers simply need to go to a website, www.donotcall.gov, and enter up to three telephone numbers. While entering a telephone number on the Do Not Call Registry can be helpful in preventing telemarketers from calling a telephone, most telemarketer call centers are moving overseas. Foreign call centers tend not to know the rules of the Do Not Call Registry or do not care about the rules since enforcement of the law against the foreign companies is difficult.

SUMMARY

To further address the problem of telemarketers continuing to call consumers despite being registered on the Do Not Call Registry, the principles of the present invention provide for providing a system and method to monitor incoming calls for unknown callers, intercept calls from unknown callers, prompt the unknown callers with a question, and enable consumers to notify the FCC about the unauthorized telemarketing call. Furthermore, the system and method may provide a caller list that enables a consumer to block selected telephone numbers from calling a telephone number of the consumer.

One embodiment of a system for reducing unwanted telemarketing calls may include a contact list manager module configured to manage a contact list of users of a telephone assigned to an associated telephone number. A call interceptor module may be configured to intercept an incoming telephone call to the telephone number and determine whether a telephone number associated with the incoming telephone call is in the contact list. A call handler module in communication with the call interceptor module, and be configured to, in response to the call interceptor module determining that the telephone number associated with the incoming telephone call is in the contact list, connect the incoming call to the telephone assigned to the called telephone number. Otherwise, in response to the call interceptor module determining that the telephone number associated with the incoming call is not in the contact list, prompt a caller with an audible message, and in response to the caller responding to the audible message by entering a first response, block the incoming telephone call from connecting to the called telephone. Otherwise, in response to the caller responding to the audible message by entering a second response, connect the incoming call to the telephone assigned to the called telephone number.

One embodiment of a system and method for reducing unwanted telemarketing calls may include storing a contact list for users of a telephone assigned to an associated telephone number. An incoming telephone call to the telephone number may be intercepted and a determination may be made as to whether a telephone number associated with a telephone used to place the incoming telephone call is in the contact list. In response to determining that the telephone number associated with the incoming telephone call is in the contact list, the incoming call may be connected to the telephone assigned to the called telephone number. Otherwise, in response to determining that the telephone number associated with the incoming call is not in the contact list, a caller may be prompted with an audible message, and, in response to the caller responding to the audible message by entering a first response, the incoming call may be blocked from connecting to the called telephone. Otherwise, in response to the caller responding to the audible message by entering a second response, the incoming call may be connected to the telephone assigned to the called telephone number.

BRIEF DESCRIPTION

Illustrative embodiments of the present invention are described in detail below with reference to the attached drawing figures, which are incorporated by reference herein and wherein.

DETAILED DESCRIPTION

Figure 1:
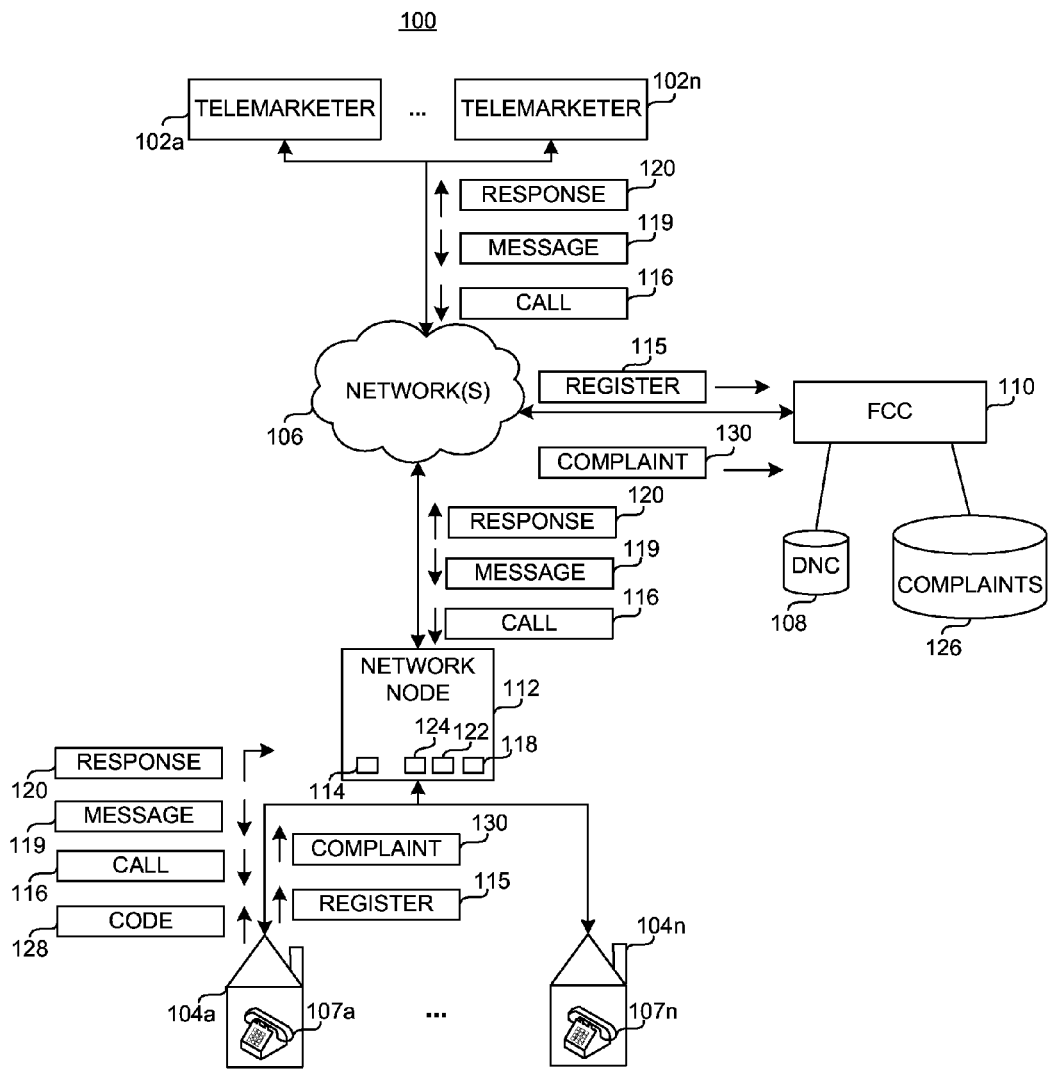
FIG. 1 is an illustration of an illustrative network environment in which telemarketers call consumers to sell products and services.

With regard to FIG. 1, an illustrative network environment 100 is shown to include telemarketers 102a-102n (collectively 102) that place calls to residences 104a-104n (collectively 104) of potential customers for products and services. The telemarketers 102 place the calls over one or more networks 106 to telephones 107a-107n (collectively 107) at the residences 104, respectively. The network(s) 106 may be the public switched telephone network (PSTN), Internet, or any other communications network, as understood in the art, that the telemarketers 102 may utilize to call the potential customers or consumers at their respective telephones 107. The telemarketers 102 may or may not be located in the United States, as understood in the art.

In accordance with Do Not Call Registry laws, a do not call (DNC) registry database 108 operated by the FCC 110 or other organizations, may be utilized to store telephone numbers associated with telephones of individuals who do not wish to receive telemarketing telephone calls. As understood in the art, the telephone numbers in the Do Not Call Registry database 108 are to be avoided by telemarketers 102, and the FCC 110 may levy fines against telemarketers 102 who place calls to telephone numbers that are registered or stored in the Do Not Call Registry database 108. However, even with the Do Not Call Registry database 108, telemarketers 102 continue to place calls to telephone numbers registered in the Do Not Call Registry database 108.

To assist consumers from receiving unwanted telephone calls from the telemarketers 102, a network node 112 may be configured to execute software 114 that operates to intercept calls to users who do not wish to receive the telephone calls from the telemarketers 102. In one embodiment, the network node 112 may be (i) a centralized network node in the network(s) 106, (ii) a network access node, such as a Type 4 or Type 5 switch operating on the PSTN to which users access the network(s) 106, or (iii) customer premise equipment (CPE) that reside with individual consumers (e.g., in the residences 104 of the consumers). In an alternative embodiment, the software 114 may be configured in a telephone that the consumers utilize. In the case where the telephone executes software 114 or software that provides a portion of the functionality of software 114, the telephone is considered to be a network node.

In operation, a user of telephone 107a may access the Do Not Call Registry database 108 and register 115 by entering a telephone number associated with the telephone 107a for storage of the telephone number in the Do Not Call Registry database 108. Registering may be performed via the Internet using a computer or telephone, via a telecommunication network using an interactive voice response (IVR) system, or otherwise, as understood in the art. In the event of telemarketer 102n placing a telephone call 116 to the telephone 107a, the network node 112 intercepts the call 116 and determines whether a telephone number associated with the telephone call 116 is listed in a contact list 118 with which the network node 112 may be in communication. In one embodiment, the contact list 118 may be stored at the network node 112, anywhere within the network(s) 106, or at the telephone 107a if the telephone 107a is executing software 114 as opposed to a node within the network(s) 106. The contact list 118 may be established by a user of the telephone 107a to identify callers to the telephone 107a to authorize callers in the contact list 118 to pass through the network node 112 without being screened.

In response to the network node 112 determining that a telephone number of the incoming telephone call 116 is not in the contact list 118, the network node 112 may communicate a message 119 to the caller to ask the caller whether he or she is a telemarketer, selling something, or otherwise soliciting from the user of the telephone 107a. The caller at the telemarketer 102n may respond 120 to the message 119, where the response 120 may be an audible or dual-tone multiple-frequency (DTMF) response to a prompt from the message 119 indicating that the telephone call 116 is, in fact, a call from a telemarketer 102n. For example, the caller may be prompted from the message 119 to, "say 'yes' or '1' if you are soliciting or attempting to sell a product or service to the user at the telephone or 'no' or '2' if you are not a telemarketer."

In response to the message 119, the telemarketer 102 is to respond in the affirmative (e.g., "yes" or "1"). If the caller is not a telemarketer (or not calling for telemarketing purposes), the caller may say "no" or enter "2" in response to the message 119. The network node 112, in response to receiving the response 120 may utilize an interactive voice response system that is executing on the network node 112 to determine the response 120 to the message 119 to determine whether or not the telephone call 116 is to be connected to the telephone 107a. If the response is "yes," then the network node may be configured to store the telephone number associated with the telephone call 116 in a call history list 122 so that the user of the telephone 107a can see calls that have been placed by telemarketers to the telephone 107a despite having registered with the Do Not Call Registry database 108. The network node 112 may also store the telephone number in a do not call list 124. In one embodiment, the network node 112 may enable the user of the telephone 107a to automatically report or otherwise submit a complaint to the FCC 110 for storage in a complaint database 126 that the FCC 110 may utilize to take action against the telemarketers 102 who call telephone numbers that are registered or listed in the Do Not Call Registry database 108. In another embodiment, the network node 112 may enable the user of the telephone 107a to store the telephone numbers of the telemarketer 102 and allow the user to selectively report or submit a complaint to the FCC 110 later on.

In the case of telephone call 116 being placed by telemarketer 120, if the telemarketer 102n provided a response 120 to the message 119 in the affirmative (i.e., "yes" or "1") to bypass the message 119 so that he or she could attempt to speak to the user of the telephone 107a, the user of the telephone 107a may, in one embodiment, enter a code 128 (e.g., "*666") that causes the network node 112 to disconnect the telephone call 116 and submit a complaint 130 to the FCC 110 for storage in the complaint's database 126. In another embodiment, the user of the telephone 107a may access the call history list 122 and do not call list 124 to determine who has called and selectively report unwanted telemarketing callers to the FCC 110.

Figure 2:
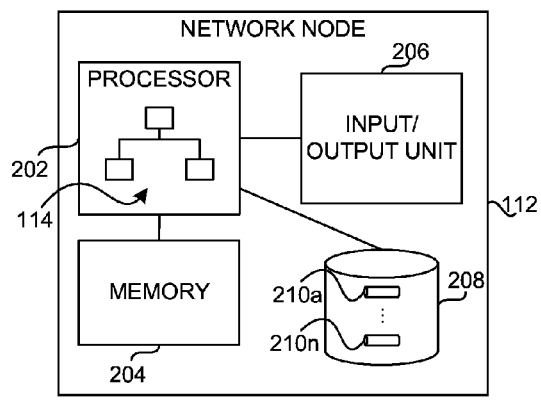
FIG. 2 is a block diagram of an illustrative network node that operates to reduce unwanted telemarketing calls.

With regard to FIG. 2, the network node 112 of FIG. 1 is shown to include a processing unit 202 that may include one or more computer processors that executes software 114. The processing unit 202 may be in communication with (i) a memory 204 that may be configured to store data, such as contact lists, and software, (ii) input/output (I/O) unit 206 configured to communicate with one or more communications networks, and (iii) storage unit 208 that is configured to store one or more data repositories 210a-210n (collectively 210). The data repositories 210 may include contact lists, do not call lists, and call history lists that users of telephones may utilize in accordance with the principles of the present invention to reduce unwanted telemarketing calls.

The software 114 may operate by intercepting telephone calls from telephone numbers that are not stored in a contact list associated with a called telephone number, prompt a user of the telephone call with a question to ascertain the meaning or purpose of the telephone call, and block the telephone call if the call is from a telemarketer. The software 114 may further be configured to maintain a record of unwanted telemarketing telephone calls by storing a telephone number in a call history list and do not call list that the user of the called telephone (i.e., the called party) may access to report the telemarketers to call despite having the telephone number registered in the Do Not Call Registry database supported by the FCC. The software 114 may further be configured to enable the user to change the name of the caller (e.g., "timeshare telemarketer") or associate telephone numbers in the do not call list so that the user may determine how many calls come from the same telemarketer with different telephone numbers, which may occur as a result of the telemarketer having multiple locations or a company using multiple telemarketers for soliciting the same telephone numbers. In associating the telephone numbers, the same name may be given to multiple telephone numbers and the name may be utilized to aggregate the number of telephone calls received from that telemarketer.

Figure 3:
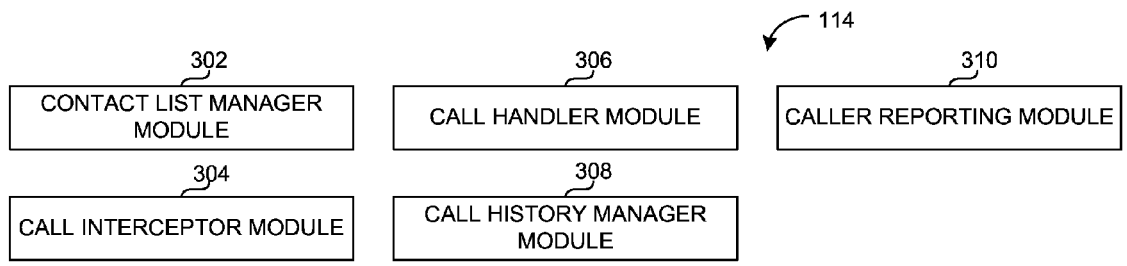
FIG. 3 is a block diagram of illustrative software modules executable by the network node of FIG. 2 and configured to reduce unwanted telemarketing calls.

With regard to FIG. 3, the software 114 is shown as being a configuration of multiple software modules. The software modules are illustrative and it should be understood that different modules may be combined or additional modules may be utilized to provide for the functionality in accordance with the principles of the present invention. A contact list manager module 302 may be configured to enable a user to establish a contact list by entering a telephone number and associated name so that the name appears when a user with the associated telephone number calls the user. The contact list may provide for additional information, such as photographs of people associated with the telephone number, as understood in the art. The call list manager module may enable a user to enter names, delete names, edit names, add multiple telephone numbers associated with each name, or otherwise, as understood in the art.

A call interceptor module 304 may be configured to intercept telephone calls that are being routed to a telephone assigned to a telephone number that is related to a contact list being managed by the contact list manager module 302. The call interceptor module 304 may operate irrespective of a telephone number associated with the telephone call being in or not in a contact list being managed by the contact list manager module 302.

A call handler module 306 may be configured to determine whether a telephone number associated with an incoming call is contained within a contact list being managed by the contact list manager module 302. The call handler module 306, in determining that the telephone number associated with an incoming call is contained within a contact list, may connect the telephone call with the telephone number to which the telephone call is being routed. Alternatively, if the call handler module 306 determines that the telephone number associated with the incoming call is not in the contact list, the call handler module may be configured to prompt the caller with a question as to whether the caller is a telemarketer and, in response to receiving a response from the caller as to whether he or she is a telemarketer, block or otherwise not connect the telephone call with the telephone that the caller is attempting to reach. The call handler module 306 may further be configured to receive a code or other command from the called party that indicates that the caller is a telemarketer despite having responded that he or she was not a telemarketer, disconnect the call, and, optionally, report the telephone number of the telemarketer to the FCC. In one embodiment, the call handler module 306 is configured to disconnect the call and prompt the called party to determine whether the called party wishes to report the caller as a telemarketer to the FCC in a complaint. The call handler module 306 may interact with an interactive voice response system being executed on the network node 112 (FIG. 2) for prompting callers and called parties for further input, as understood in the art.

A call history manager module 308 may be configured to manage a list of callers to called telephones by storing times, dates, names, and telephone numbers of callers to telephones. The call history manager module 308 may further be configured to enable the user to access the list of called telephone numbers and edit the list, report unwanted telemarketing calls to the FCC, set the telephone numbers of unwanted telemarketing calls to be blocked in the future, or otherwise.

A caller reporting module 310 may be configured in enable a user to report an unwanted telemarketing caller during a telephone call or access a do not call list or call history list to report the unwanted telemarketing callers to the FCC. The caller reporting module 310 may be configured to receive requests from the call handler module 306 or call history manager module 308 to handle reporting to the FCC. In one embodiment, the caller reporting module 310 may be configured to communicate a text message or a data message to the FCC via a digital communications network or communicate an audio message using a voice synthesizer to call a hotline of the FCC and leave a message as to the telephone number of the caller, telephone number of the called party, date and time, name of the caller, if available, name of the called party, and any other information that may assist the FCC in following up with the unlawful call by the telemarketer to the telephone number that is listed in the Do Not Call Registry.

Figure 4:
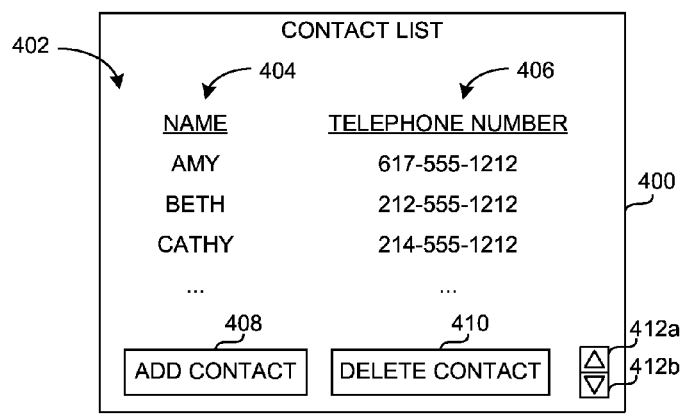
FIG. 4 is a screen shot of an illustrative contact list of a user of a telephone.

With regard to FIG. 4, a screen shot 400 of an illustrative contact list 402 is shown. The screen shot 400 may be that from a computer that accesses the contact list 402 via the Internet or other communications network. Alternatively, the screen shot 400 may be that of a telephone that includes an electronic display that is able to access the contact list 402. In one embodiment, the telephone with the electronic display is a Voice over Internet Protocol (VoIP) telephone that is Internet compatible. The contact list 402 may include names 404 and telephone numbers 406 associated with the names 404. An add contact soft-button 408 may be selected by a user to add additional contacts to the contact list 402. A delete contact soft-button 410 may be configured to enable a user to delete a contact in the contact list 402. In one embodiment, a user may select or highlight a contact and select the delete contact soft-button 410 to delete the contact selected. Other functionality to edit or otherwise manipulate the information in the contact list 402 may be provided, as understood in the art. The soft-buttons 408 and 410 may be selected by a user via a touch-screen electronic display or using a pointer, such as a computer mouse. Control elements 412a and 412b may enable the user to respectively scroll up and down the information in the contact list 402, as understood in the art. The contact list 402 may be utilized by the network node 112 or telephone to identify whether call is to the telephone authorized or should be intercepted as previously described.

Figure 5:
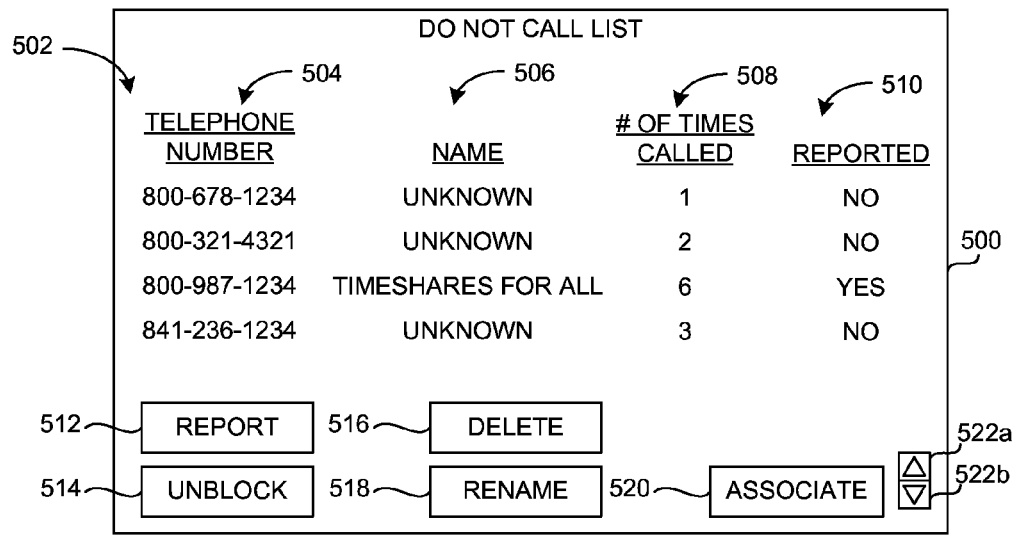
FIG. 5 is a screen shot of an illustrative do not call list that assists in preventing calls from unwanted telemarketing callers.

With regard to FIG. 5, a screen shot 500 of a do not call list 502 is shown. The do not call list 502 may include telephone numbers 504, name 506, number of times called 508, and reported 510 data fields to enable a user to track the names of unauthorized callers from a telephone number, the number of times that the user has been called by the telephone number and whether or not the user has reported the caller to the FCC. A report soft-button 512 may be configured to enable a user to report a telephone number to the FCC by highlighting or otherwise selecting the telephone number to report and selecting the report soft-button 512. An unblocked soft-button 514 may enable a user to unblock a telephone number that mistakenly or unmistakenly ended up on the do not call list 502. A delete soft-button 516 may be configured to enable the user to delete a listing in the do not call list 502. A rename soft-button may enable the user to rename a name associated with a telephone number in the do not call list 502. An associate soft-button 520 may be configured to enable the user to associate one or more telephone numbers so that a cumulative number of times called by the same caller with different telephone numbers may be provided to the user. Control elements 522a and 522b may enable the user to scroll through the do not call list 502, as understood in the art.

Figure 6:
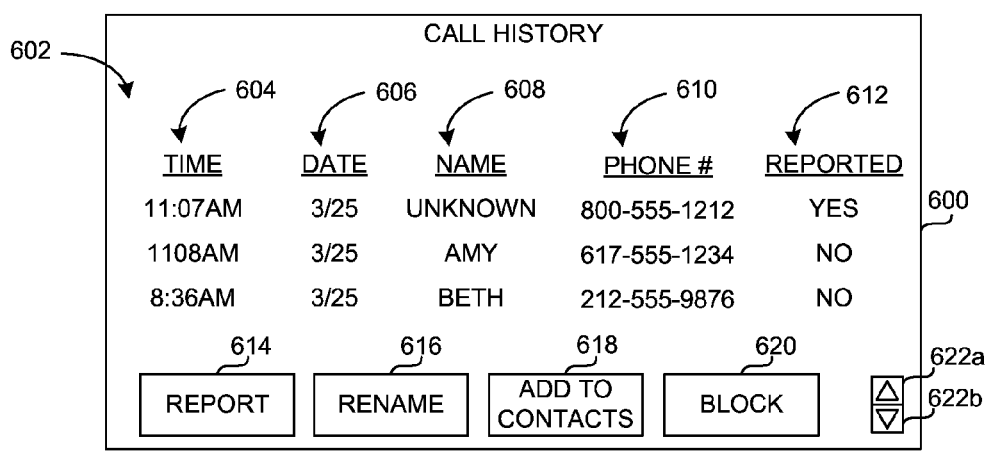
FIG. 6 is a screen shot of an illustrative call history list that may be utilized by a called party to manage calls from unwanted callers.

With regard to FIG. 6, a screen shot 600 of an illustrative call history list 602 is shown. The call history list 602 may include time 604, date 606, name 608, telephone number 610, and reported status 612. The call history list 602 may include listings of contacts of people in the contact list 402 (FIG. 4) and unknown callers who call the telephone number of a telephone of the user. The call history list 602 may provide an indication as to whether the user has reported unknown callers to the FCC. In one embodiment, a report soft-button 614 may be utilized to enable the user to report unwanted solicitations from a telemarketer. A rename soft-button 616 may enable the user to rename names 608 listed in the contact list

602. An add to contacts soft-button 618 may enable the user to selectively add names and telephone numbers listed in the call history list 602 to the contact list 402 (FIG. 4). A block soft-button 620 may enable the user to block future calls from a telephone number listed in the call history list 602. Control elements 622a and 622b may enable the user to scroll through the contact list 602, as understood in the art.

Figure 7:
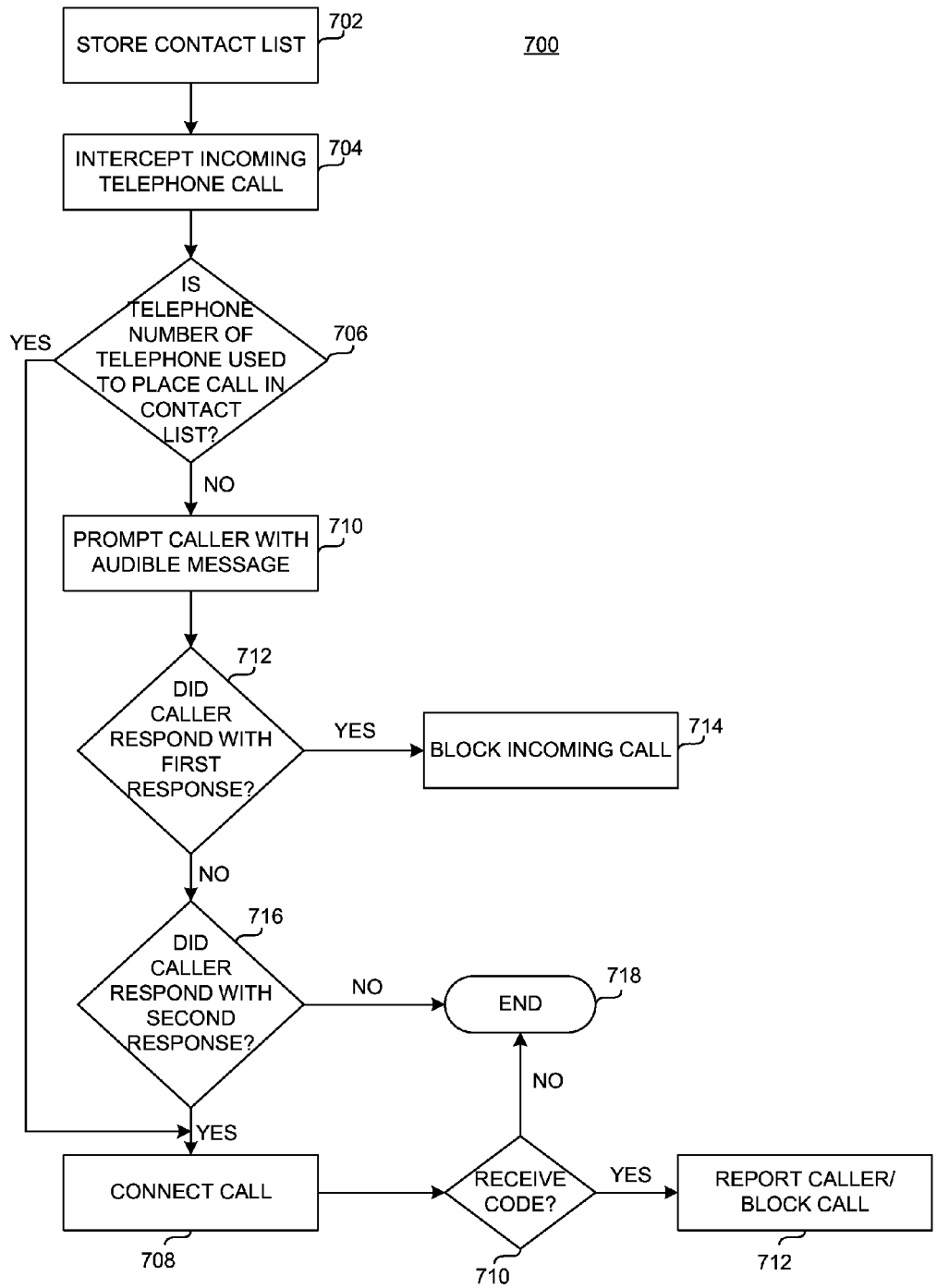
FIG. 7 is a flow diagram of an illustrative process for reducing unwanted telemarketing calls to a telephone.

With regard to FIG. 7, a flowchart of an illustrative process 700 that reduces unwanted telemarketing calls is provided. The process 700 may store a contact list at step 702 that includes names and telephone numbers of contacts of a user. At step 704, an incoming telephone call may be intercepted that is being routed to a telephone number of a telephone of the caller. In intercepting the incoming telephone call at step 704, the telephone call may be prevented from being connected to the telephone until a determination may be made as to whether the telephone number of the telephone call is in the contact list or the caller identifies him or herself as not being a telemarketer. At step 706, a determination may be made as to whether the telephone number of the telephone used to place the call is in the contact list. If so, then the call may be connected to the telephone being called at step 708. In connecting the call, the telephone being called may be rung, but does not necessarily have to be answered by a called party. Alternatively, if the telephone number of the telephone used to place the call is not in the contact list, then the caller may be prompted with an audible message. In prompting the caller with an audible message, the caller may be prompted using a voice synthesizer to ask the caller a question, such as "Are you a telemarketer? Say "yes" or enter "1" if so. Otherwise, say "No" or press "2"." If, at step 712, the caller responds with a first response (e.g., "yes" or "1"), then the process continues at step 714 where the incoming call is blocked. Alternatively, if the caller did not respond with a first response, then a determination is made as to whether the caller responded with a second response (e.g., "no" or "2"). If not then the process ends at step 718, as it may be assumed that the caller did not know how to respond or simply did not respond. If the caller did respond with the second response, which may indicate that the caller is not a telemarketer, then the call is connected at step 708. It should be understood that if the caller responded with the second response and is a telemarketer, that the called party may enter a code (e.g., "*666") and, if a determination is made at step 710 that the code was received, then the process may continue at step 712 to report the caller to the FCC and/or block the call. Alternatively, if no code was received at step 710, then the process continues at step 718 where the call is ended by the caller upon completion of the call as opposed to being affirmatively terminated to report a caller as being an unwanted telemarketer.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A system for reducing unwanted telemarketing calls, said system comprising:
   a contact list manager module configured to manage a contact list of users of a telephone assigned to an associated telephone number;
   a call interceptor module configured to intercept an incoming telephone call to the telephone number and determine whether a telephone number associated with the incoming telephone call is in the contact list;
   a call handler module in communication with said call interceptor module, and configured to:
      in response to said call interceptor module determining that the telephone number associated with the incoming telephone call is in the contact list, connect the incoming call to the telephone assigned to the called telephone number;
      otherwise, in response to said call interceptor module determining that the telephone number associated with the incoming call is not in the contact list:
         prompt a caller with an audible message;
         in response to the caller responding to the audible message by entering a first verbal response, block the incoming telephone call from connecting to the called telephone; and
         otherwise, in response to the caller responding to the audible message by entering a second verbal response, connect the incoming call to the telephone assigned to the called telephone number.

2. The system according to claim 1, further comprising a call history manager module that is configured to present a list of telephone numbers from callers that were determined not to be in the contact list.

3. The system according to claim 2, wherein said call interceptor is further configured to determine if the telephone number associated with the incoming call is on the list of telephone numbers that were determined to not be in the contact list, and wherein said call handler module is further configured to block the incoming telephone call from connecting to the called telephone and to report the telephone number of the incoming call.

4. The system according to claim 2, wherein said call history manager module is further configured to enable a user to assign a name to each of the telephone numbers in the list of telephone numbers not in the contact list.

5. The system according to claim 1, further comprising a caller reporting module configured to enable the called party to report the telephone number of the incoming call.

6. The system according to claim 5, wherein said caller reporting module is further configured to disconnect the telephone call prior to reporting the telephone number.

7. The system according to claim 1, wherein said call handler module is further configured to, in response to the caller entering the first verbal response, communicate a second audible message to the caller.

8. A method for reducing unwanted telemarketing calls, said method comprising:
   storing, at a contract list manager, a contact list for users of a telephone assigned to an associated telephone number;
   intercepting, at a call interceptor, an incoming telephone call to the telephone number;
   determining, at the call interceptor, whether a telephone number associated with a telephone used to place the incoming telephone call is in the contact list;
   in response to determining that the telephone number associated with the incoming telephone call is in the contact list, connecting, at a call handler module, the incoming call to the telephone assigned to the called telephone number;
   otherwise, in response to determining that the telephone number associated with the incoming call is not in the contact list:
      prompting, at the call handler module, a caller with an audible message;

in response to the caller responding to the audible message by entering a first verbal response, blocking, at the call handler module, the incoming call from connecting to the called telephone;

otherwise, in response to the caller responding to the audible message by entering a second verbal response, connecting, at the call handler module, the incoming call to the telephone assigned to the called telephone number.

9. The method according to claim 8, further comprising displaying, at a call history manager module, a list of telephone numbers from callers that were determined not to be in the contact list.

10. The method according to claim 9, further comprising:
determining, at the call interceptor, if the telephone number associated with the incoming call is on the list of telephone numbers that were determined to not be in the contact list;
blocking, at the call handler module, the incoming call from connecting to the called telephone; and
reporting, at the call handler module, the telephone number of the incoming call.

11. The method according to claim 9, further comprising enabling, at the call history manager module, a user to assign a name to each of the telephone numbers in the list of telephone numbers not in the contact list.

12. The method according to claim 8, further comprising enabling, at a caller reporting module, the called party to report the telephone number of the incoming call.

13. The method according to claim 12, further comprising disconnecting, at the caller reporting module, the telephone call prior to reporting the telephone number.

14. The method according to claim 8, further comprising, in response to the caller entering the first verbal response, communicating, at the call handler module, a second audible message to the caller.

15. A system for reducing unwanted telemarketing calls, said system comprising:
a storage unit configured to store a data repository;
an input/output unit configured to communicate over a communications network;
a processing unit in communication with said storage unit and input/output unit, and configured to:
store a contact list in the data repository for users of a telephone assigned to an associated telephone number;
intercept an incoming telephone call to the telephone number;
determine whether a telephone number associated with a telephone used to place the incoming telephone call is in the contact list;
in response to determining that the telephone number associated with the incoming telephone call is in the contact list, connect the incoming telephone call to the telephone assigned to the called telephone number;
otherwise, in response to determining that the telephone number associated with the incoming telephone call is not in the contact list:
prompt a caller with an audible message;
in response to the caller responding to the audible message by entering a first verbal response, block the incoming call from connecting to the called telephone;
otherwise, in response to the caller responding to the audible message by entering a second verbal response, connect the incoming call to the telephone assigned to the called telephone number.

16. The system according to claim 15, wherein said processing unit is further configured to add the telephone number of the incoming call to a do not call list in the data repository in response to the caller responding to the audible message by entering the first verbal response.

17. The system according to claim 15, wherein said processing unit is further configured to enable a called party to disconnect from the telephone call and add the telephone number to a do not call list to prevent the caller from calling the called telephone number again.

18. The system according to claim 15, wherein said processing unit is further configured to enable the called party to report the telephone number of the incoming call.

19. The system according to claim 15, wherein said processing unit is further configured to communicate a second audible message to the caller in response to the called party entering a code after the incoming telephone call has been connected to the telephone assigned to the called telephone number.

20. The system according to claim 15, wherein the audible message is a question to the caller requesting that the caller indicate whether the call is a telemarketing call.

* * * * *